US012761825B2

(12) United States Patent
Bao et al.

(10) Patent No.: US 12,761,825 B2
(45) Date of Patent: Oct. 13, 2026

(54) STORING DATA BASED ON DISK REDUNDANT ARRAY PROTECTION MECHANISM

(71) Applicant: Zhongshan Longsys Electronics Co., Ltd., Zhongshan (CN)

(72) Inventors: Qiming Bao, Zhongshan (CN); Hui Yin, Zhongshan (CN)

(73) Assignee: Zhongshan Longsys Electronics Co., Ltd., Zhongshan (CN)

( * ) Notice: Subject to any disclaimer, the term of this patent is extended or adjusted under 35 U.S.C. 154(b) by 0 days.

(21) Appl. No.: 19/029,393

(22) Filed: Jan. 17, 2025

(65) Prior Publication Data

US 2025/0165170 A1 May 22, 2025

Related U.S. Application Data

(63) Continuation of application No. PCT/CN2022/115837, filed on Aug. 30, 2022.

(30) Foreign Application Priority Data

Aug. 5, 2022 (CN) ......................... 202210943076.2

(51) Int. Cl.
*G06F 3/06* (2006.01)

(52) U.S. Cl.
CPC ............ *G06F 3/064* (2013.01); *G06F 3/0602* (2013.01); *G06F 3/0655* (2013.01); *G06F 3/0679* (2013.01)

(58) Field of Classification Search
CPC ...... G06F 3/064; G06F 3/0688; G06F 3/0602; G06F 3/0614; G06F 3/0619; G06F 3/0644; G06F 3/0655; G06F 3/0679; G06F 11/10; G06F 11/1068; G06F 11/1012; G06F 11/108; G06F 11/1044; G11C 29/52; G11C 29/0411; G11C 29/42; G11C 29/44
See application file for complete search history.

(56) References Cited

U.S. PATENT DOCUMENTS

| | | | | |
|---|---|---|---|---|
| 2008/0215800 | A1* | 9/2008 | Lee | G06F 12/1416 711/E12.098 |
| 2014/0006898 | A1 | 1/2014 | Sharon et al. | |
| 2018/0314445 | A1* | 11/2018 | Karale | G06F 3/067 |
| 2020/0117538 | A1* | 4/2020 | Singidi | G06F 12/0246 |
| 2020/0293441 | A1* | 9/2020 | Lin | G06F 13/1694 |

(Continued)

FOREIGN PATENT DOCUMENTS

| | | | |
|---|---|---|---|
| CN | 101095116 | A | 12/2007 |
| CN | 110347528 | A | 10/2019 |

(Continued)

OTHER PUBLICATIONS

Wang et al. NPL: "CR5M: A Mirroring-Powered Channel-RAID5 Architecture for an SSD" (Year: 2014).*

(Continued)

*Primary Examiner* — Tracy C Chan

(57) ABSTRACT

A data storage method includes: binding storage blocks, which are corresponding to each plane of each of a plurality of logical units in a storage device, to each other to form a superblock; performing, using a corresponding disk redundancy array protection mechanism, data storage operations based on a type of the superblock and a data type of to-be-written data.

17 Claims, 11 Drawing Sheets

(56) References Cited

U.S. PATENT DOCUMENTS

| | | | | |
|---|---|---|---|---|
| 2021/0327529 | A1* | 10/2021 | Moon | G11C 29/14 |
| 2021/0342222 | A1 | 11/2021 | Nakai | |
| 2022/0137829 | A1* | 5/2022 | Lee | G06F 11/1076 711/114 |
| 2022/0139466 | A1 | 5/2022 | Gorobets et al. | |

FOREIGN PATENT DOCUMENTS

| | | | |
|---|---|---|---|
| CN | 111506262 | A | 8/2020 |
| CN | 111694510 | A | 9/2020 |
| CN | 113535460 | A | 10/2021 |
| CN | 111710358 | B | 6/2022 |
| WO | WO2020/076582 | * | 10/2019 |

OTHER PUBLICATIONS

International Search Report and Written Opinion, International Application No. PCT/CN2022/115837, International mailed Dec. 27, 2022 (13 pages).
European Search Report, European Application No. 22953752.7, mailed Apr. 23, 2026 (19 pages).
European Invention partial Search Report, European Application No. 22953752.7, mailed Dec. 23, 2025 (16 pages).

* cited by examiner

STORING DATA BASED ON DISK REDUNDANT ARRAY PROTECTION MECHANISM

CROSS-REFERENCE TO RELATED APPLICATIONS

The present application is a continuation application of the international patent application No. PCT/CN2022/115837, filed on Aug. 30, 2022, which claims the priority of the Chinese patent application No. 202210943076.2, filed on Aug. 5, 2022, and contents of which are incorporated herein by its entireties.

TECHNICAL FIELD

Embodiments of the present disclosure relate to the technical field of data storing, and more specifically, to a data storage method, an apparatus, a storage device, and a computer-readable storage medium.

BACKGROUND

A Nand Flash, serving as a non-volatile storage medium, has a low cost, a high speed, and low power consumption, and therefore, the Nand Flash brings better experience to users. In the art, the Nand Flash is widely used in various storage devices. However, as time passes by, low reliability of the Nand Flash is more prominent. Due to a structure of the Nand Flash, data stored in the Nand Flash may be bit flipped. When the number of bit flip exceeds an error correction capability of Error Checking and Correction (ECC), another error correction algorithm is required. A Solid State Disk is usually composed of a plurality of logical units (LUN), any error in data of one logical unit may affect integrity of the data, such that a probability of data errors is increased. For error correction algorithms in the art, similar to disk redundant arrays, a user-available over provisioning (OP) space is reduced, write amplification (WA) becomes larger, and performance may be reduced.

SUMMARY

The present disclosure provides a data storage method, an apparatus, a storage device, and a computer-readable storage medium, so as to reduce a loss in the user-available OP space.

In a first aspect, the present disclosure provides a data storage method, including: binding storage blocks, which are corresponding to each plane of each of a plurality of logical units in a storage device, to each other to form a superblock; performing, using a corresponding disk redundancy array protection mechanism, data storage operations based on a type of the superblock and a data type of to-be-written data.

In some embodiments, the superblock is at least one of: a first class private data SLC block, a second class private data SLC block, a user data SLC block, and a user data XLC block.

In some embodiments, the superblock is a first class private data SLC block; and the performing, using the corresponding disk redundancy array protection mechanism, data storage operations based on the type of the superblock and the data type of to-be-written data, includes: writing the to-be-written data into both a first logical unit of the superblock and a second logical unit of the superblock when receiving a request of writing the to-be-written data, wherein the second logical unit is mirrored with the first logical unit; restoring, when an error occurring in the data in the first logical unit, the data by mirroring the data in the second logical unit.

In some embodiments, the superblock is a second class private data SLC block; and the performing, using the corresponding disk redundancy array protection mechanism, data storage operations based on the type of the superblock and the data type of to-be-written data, includes: writing the to-be-written data sequentially into the plurality of logical units of the superblock when receiving a request of writing the to-be-written data; performing an exclusive-OR (XOR) operation on the to-be-written data to obtain parity data; writing the parity data into a last plane of a last logical unit of the plurality of logical units; restoring, when an error occurring in the data in any plane of any one of the plurality of logical units, the data by performing the XOR operation on the data in the plurality of logical units.

In some embodiments, the superblock is a user data SLC block or a user data XLC block; and the performing, using the corresponding disk redundancy array protection mechanism, data storage operations based on the type of the superblock and the data type of to-be-written data, includes: dividing the superblock into a plurality of disk redundancy array groups, wherein the number of the plurality of disk redundancy array groups is determined based on the number of pages contained in the predetermined number of Word-Lines in the storage block; writing the to-be-written data are written into the plurality of the disk redundant array groups when receiving a request of writing the to-be-written data; obtaining parity data corresponding to each of the plurality of disk redundant array groups; writing the parity data corresponding to each of the plurality of disk redundancy array groups into a last plane of a last logical unit in the corresponding one of the plurality of disk redundancy array groups; and restoring, when an error occurring in the data in one plane, the data by performing an XOR operation on the data that is in a same disk redundancy array group as the plane having the error.

In some embodiments, the obtaining parity data corresponding to each of the plurality of disk redundant array groups, includes: performing the XOR operation on the data of each of the plurality of disk redundancy array groups to obtain the parity data corresponding to each of the plurality of disk redundancy array groups; or obtaining, through a buffer swapping mechanism, the parity data corresponding to each of the plurality of disk redundancy array groups.

In some embodiments, the obtaining, through the buffer swapping mechanism, the parity data corresponding to each of the plurality of disk redundancy array groups, includes: parsing the request of writing the to-be-written data to determine one disk redundant array group of the plurality of disk redundant array groups corresponding to the to-be-written data; searching whether parity data of the disk redundant array group corresponding to the to-be-written data exists in a disk redundant array memory; performing, when the parity data existing, the XOR operation on the data of each of the plurality of disk redundant array groups to obtain the parity data corresponding to each of the plurality of disk redundant array groups; and writing, when the parity data not existing, parity data of the other disk redundancy array groups into a swap block; and reading the parity data of the disk redundancy array group corresponding to the to-be-written data from the swap block.

In a second aspect, the present disclosure provides a data storage apparatus, including: a dividing module, configured to bind storage blocks, which are corresponding to each plane of each of a plurality of logical units in a storage device, to each other to form a superblock; and a processing module, configured to perform, using a corresponding disk redundancy array protection mechanism, data storage operations based on a type of the superblock and a data type of to-be-written data.

In a third aspect, the present disclosure provides a storage device, including a processor and a memory connected to the processor. The memory is configured to store program instructions, the processor is configured to execute the program instructions to implement the data storage method of the first aspect.

In a fourth aspect, the present disclosure provides a computer-readable storage medium, storing program instructions. The program instructions, when being executed by a processor, are configured to implement the data storage method of the first aspect.

According to the present disclosure, storage blocks corresponding to each plane of the plurality of logical units in the storage device are bound to each other to form a superblock. Data are stored using a corresponding disk redundant array protection mechanism, based on a type of the superblock and a data type of the to-be-written data. By binding the storage blocks corresponding to each plane of the plurality of logical units in the storage device as one superblock and setting the corresponding disk redundant array protection mechanism based on an application scenario of the superblock, an overall protection capability is improved, and a loss in the user-available OP is reduced.

BRIEF DESCRIPTION OF THE DRAWINGS

In order to more clearly illustrate technical solutions in embodiments of the present disclosure, accompanying drawings used in the embodiments will be briefly introduced below. Obviously, the accompanying drawings in the following description show only some of the embodiments of the present disclosure, and any ordinary skilled person in the art may obtain other accompanying drawings based on these drawings without creative work.

DETAILED DESCRIPTIONS

Technical solutions of embodiments of the present disclosure will be described in detail in the following by referring to the accompanying drawings of the specification.

In the following description, specific details such as particular system structures, interfaces, techniques, and the like are presented for illustrative purposes rather than for limitation, such that the present disclosure can be understood thoroughly.

Terms "system" and "network" are often used interchangeably herein. The term "and/or", as used herein, is merely a description of an association relationship of associated objects, indicating that three types of relationships may exist. For example, A and/or B means that A is present alone, both A and B are present, and B is present alone. In addition, the character "/" indicates that the objects before the character "or" the object after the character. In addition, "a plurality of" means two or more than two.

Figure 1:
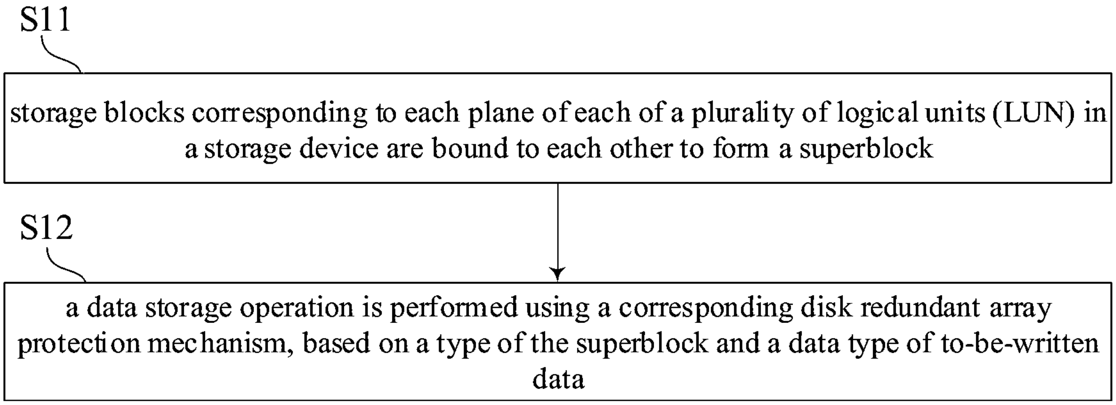
FIG. 1 is a flow chart of a data storage method according to an embodiment of the present disclosure.

As shown in FIG. 1, FIG. 1 is a flow chart of a data storage method according to an embodiment of the present disclosure. The method includes following blocks.

In a block S11, storage blocks corresponding to each plane of each of a plurality of logical units (LUN) in a storage device are bound to each other to form a superblock.

Figure 2:
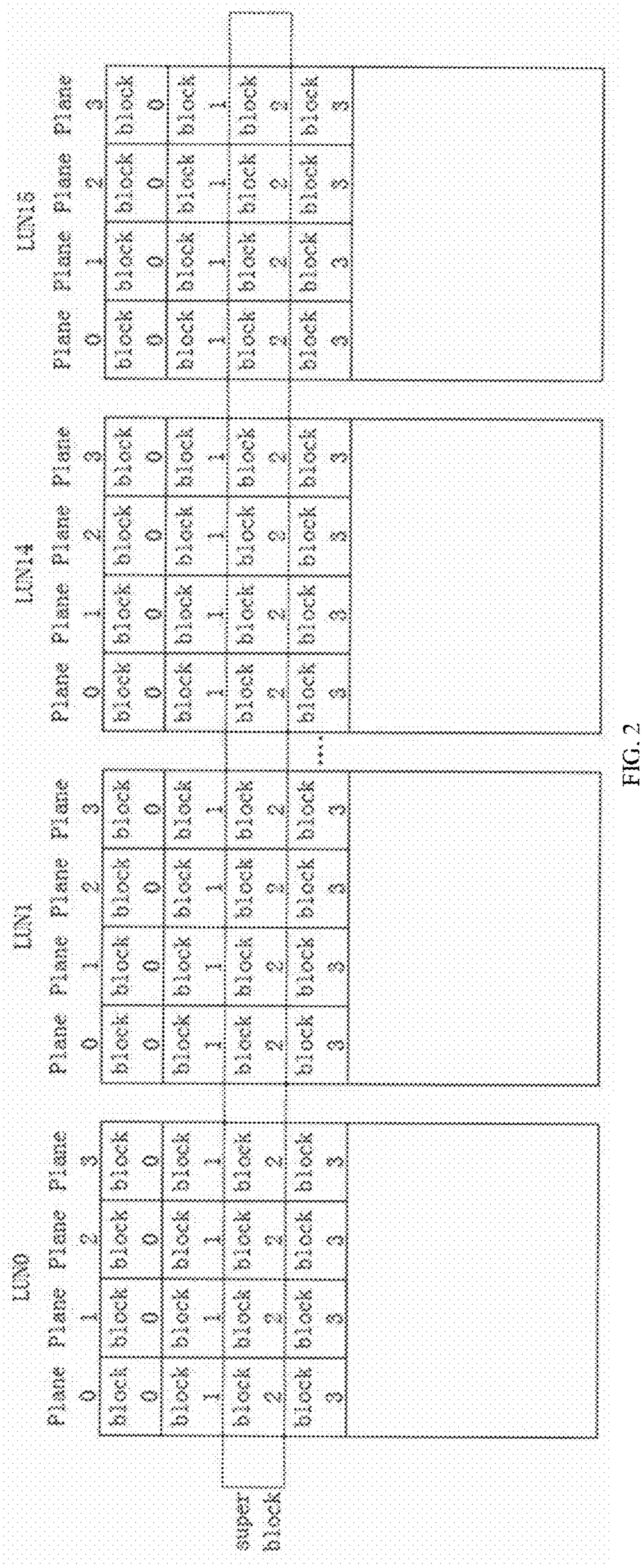
FIG. 2 is a schematic view of block division for the superblock according to an embodiment of the present disclosure.

The data storage method of the present disclosure can be applied to a solid state drive or another storage device using a Nand Flash as a storage medium. As shown in FIG. 2, FIG. 2 is a schematic view of block division for the superblock according to an embodiment of the present disclosure. Blocks (the storage blocks) corresponding to each a plurality of planes of each of the plurality of LUNs are bound to each other to form a single block, named as the superblock. For firmware development of the solid state drive, the superblock is treated as one basic operation unit.

In a block S12, a data storage operation is performed using a corresponding disk redundant array protection mechanism, based on a type of the superblock and a data type of to-be-written data.

In an embodiment, the superblock may be at least one of: a first class private data SLC block, a second class private data SLC block, a user data SLC block, and a user data XLC block. Specifically, the first class private data SLC block is a most important Table storage area with a small amount of data. The second class private data SLC block is an important Table and debugging information storage area with a small amount of data. The user data SLC block is a data cache area into which data can be written at a fast writing speed. The user data XLC block is a data storage area.

In the above embodiment, the storage blocks corresponding to each plane of each of the plurality of logical units in the storage device are bound to each other to form one superblock, and the data storage operation can be performed using the corresponding disk redundant array protection mechanism based on the type of the superblock and the data type of the to-be-written data. By binding the storage blocks corresponding to each plane of each of the plurality of logical units in the storage device as one superblock and setting the corresponding disk redundant array protection mechanism according to application scenarios of the superblock, an overall protection capability is improved, and a loss in a user-available OP is reduced.

Figure 3:
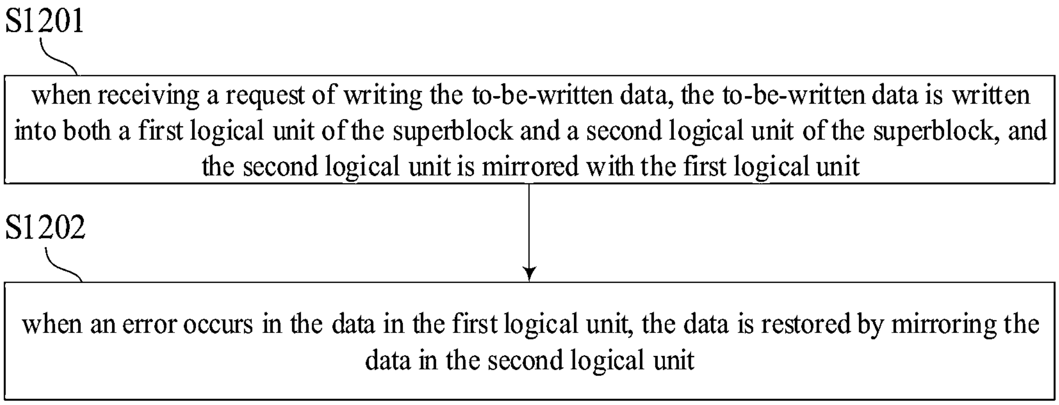
FIG. 3 is a flow chart of a block S12 shown in FIG. 1, according to an embodiment of the present disclosure.

As shown in FIG. 3, FIG. 3 is a flow chart of a block S12 shown in FIG. 1, according to an embodiment of the present disclosure.

In an embodiment, the superblock is the first class private data SLC block; the block S12 specifically includes following blocks.

In a block S1201, when receiving a request of writing the to-be-written data, the to-be-written data is written into both a first logical unit of the superblock and a second logical unit of the superblock, and the second logical unit is mirrored with the first logical unit.

In a block S1202, when an error occurs in the data in the first logical unit, the data is restored by mirroring the data in the second logical unit.

Figure 4:
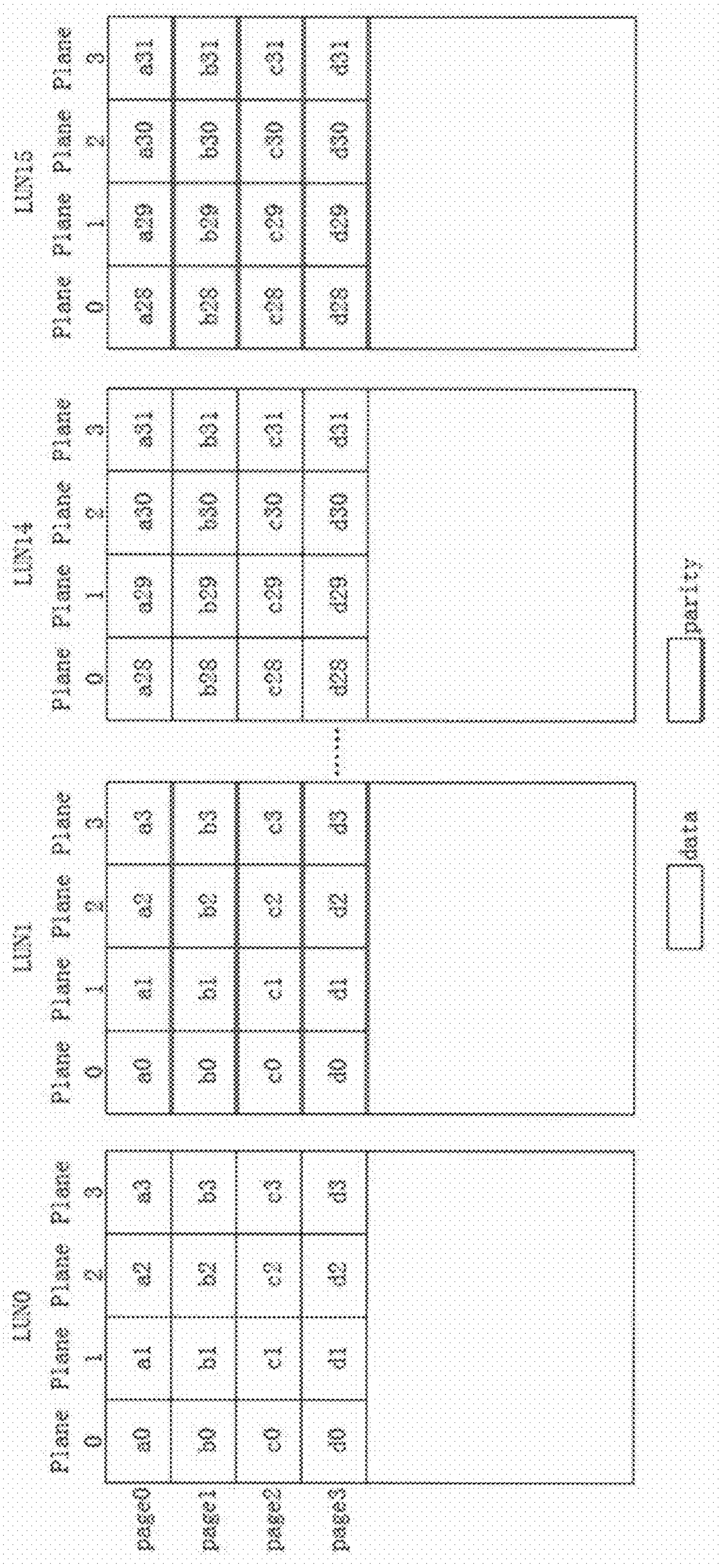
FIG. 4 is a flow chart of the data storage method applied in an application scenario shown in FIG. 3, according to an embodiment of the present disclosure.

As shown in FIG. 4, FIG. 4 is a flow chart of the data storage method applied in an application scenario shown in FIG. 3, according to an embodiment of the present disclosure. For example, when a request of write the to-be-written data (a0-a3) is received, the to-be-written data (a0-a3) are written into the first logical unit LUN0, and at the same time, the to-be-written data (a0-a3) are written into the second logical unit LUN1. The second logical unit LUN1 is mirrored with the first logical unit LUN0. The other LUNs are similar to the logical units LUN0 and LUN1, where every two logical units LUNs are mirrored to each other. Therefore, operations of writing other to-be-written data (a4-a31, b0-b31, c0-c31, d0-d31, and so on) are the same as the operation of writing the to-be-written data (a0-a3). It is understood that when an error occurs in the data of any logical unit LUN, the data can be restored by mirroring the logical unit LUN mirrored to the logical unit LUN having the error. For example, when an error occurs in the data in the first logical unit LUN0, the data can be restored by mirroring the second logical unit LUN1.

Figure 5:
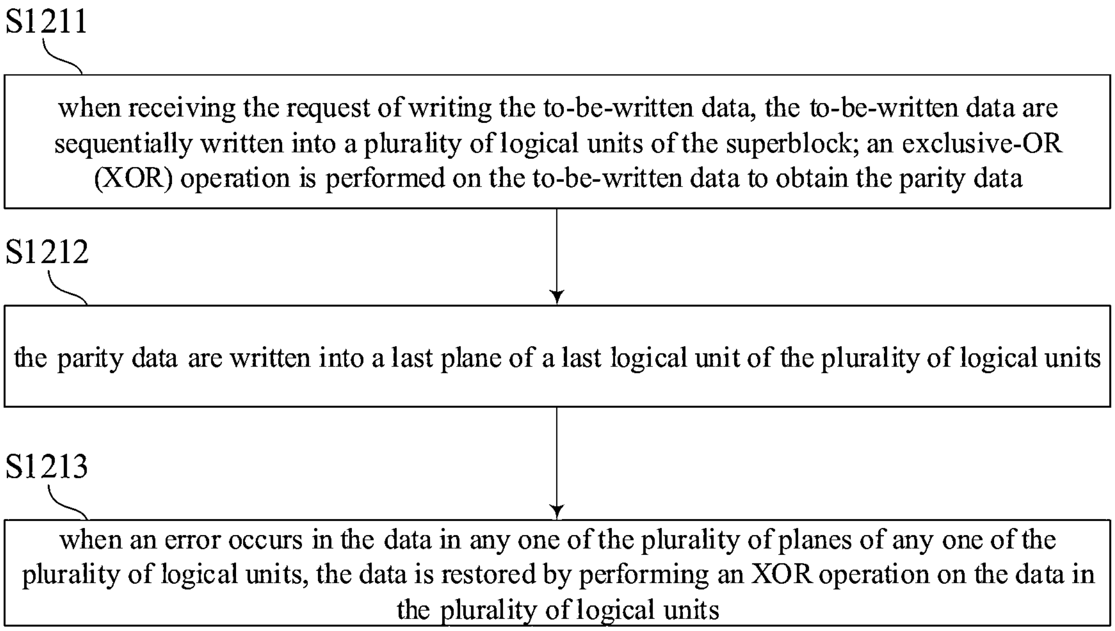
FIG. 5 is a flow chart of the block S12 shown in FIG. 1, according to another embodiment of the present disclosure.

As shown in FIG. 5, FIG. 5 is a flow chart of the block S12 shown in FIG. 1, according to another embodiment of the present disclosure. In an embodiment, the superblock is the second class private data SLC block; the block S12 specifically includes following blocks.

In a block S1211, when receiving the request of writing the to-be-written data, the to-be-written data are sequentially written into a plurality of logical units of the superblock; an exclusive-OR (XOR) operation is performed on the to-be-written data to obtain the parity data.

In a block S1212, the parity data are written into a last plane of a last logical unit of the plurality of logical units.

In a block S1213, when an error occurs in the data in any one of the plurality of planes of any one of the plurality of logical units, the data is restored by performing an XOR operation on the data in the plurality of logical units.

Figure 6:
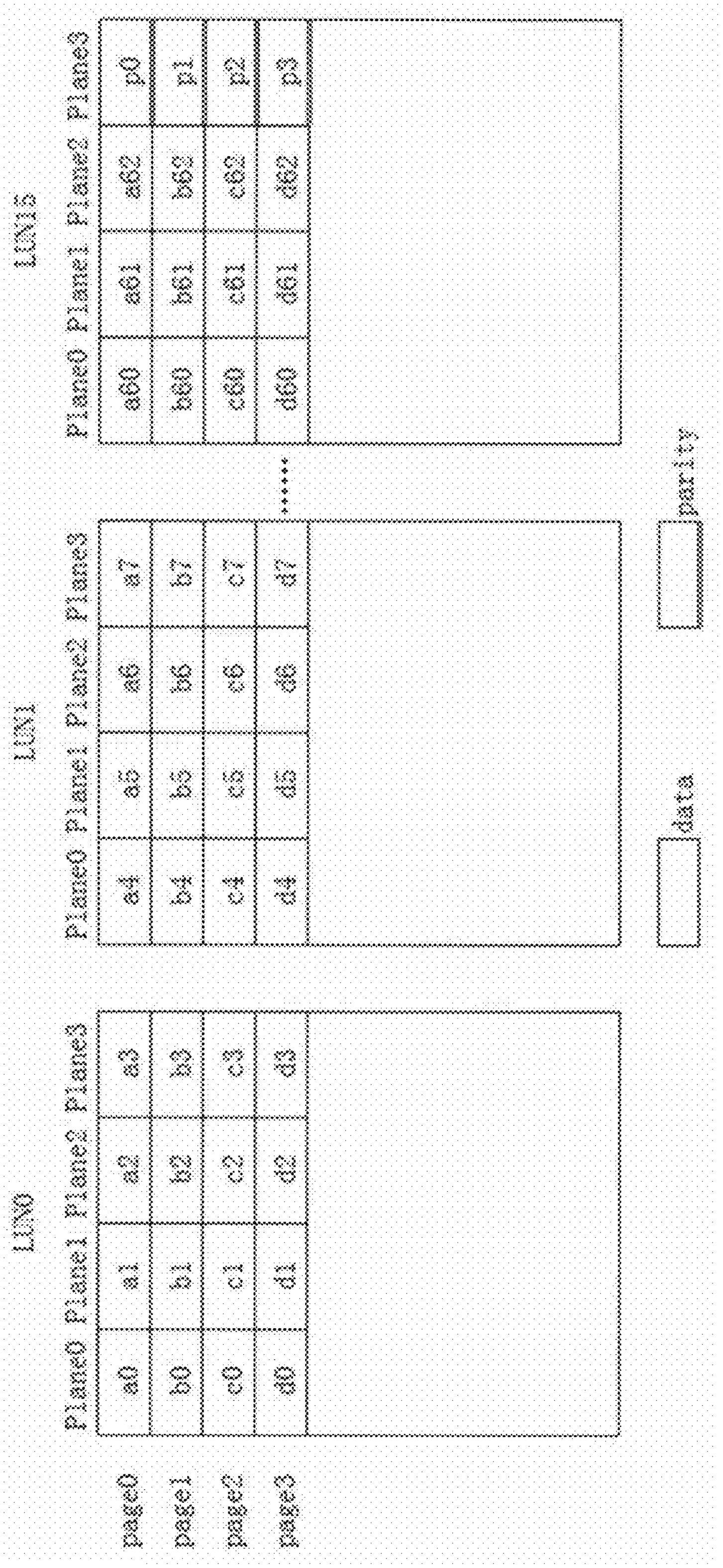
FIG. 6 is a flow chart of the data storage method applied in an application scenario shown in FIG. 5, according to an embodiment of the present disclosure.

As shown in FIG. 6, FIG. 6 is a flow chart of the data storage method applied in an application scenario shown in FIG. 5, according to an embodiment of the present disclosure. For example, when a request of write the to-be-written data (a0-a62) is received, the to-be-written data (a0-a62) are sequentially written into logical units LUN0 to LUN15 of the superblock, and the XOR operation is performed on the to-be-written data (a0-a62). When the XOR operation is finished performing on the to-be-written data (a0-a62) to obtain the parity data (p0), the parity data (p0) is written to the last plane of the last logical unit LUN. That is, the p0 is written to a plane 3 of the logical unit LUN 15. In this way, the to-be-written data (a0-a62) and the parity data (p0) cooperatively form a disk redundancy array (RAID) group. When any one of the to-be-written data (a0-a62) has the error, the data can be restored by the other data and the parity data (p0). It is understood that operations of the other to-be-written data (b0-b62, c0-c62, d0-d62, and so on) are the same as the operation of the to-be-written data (a0-a62). When an error occurs in the data of one plane, the data can be restored by performing the XOR operation on the data of other planes that are in the same RAID group as the plane having the error.

Figure 7:
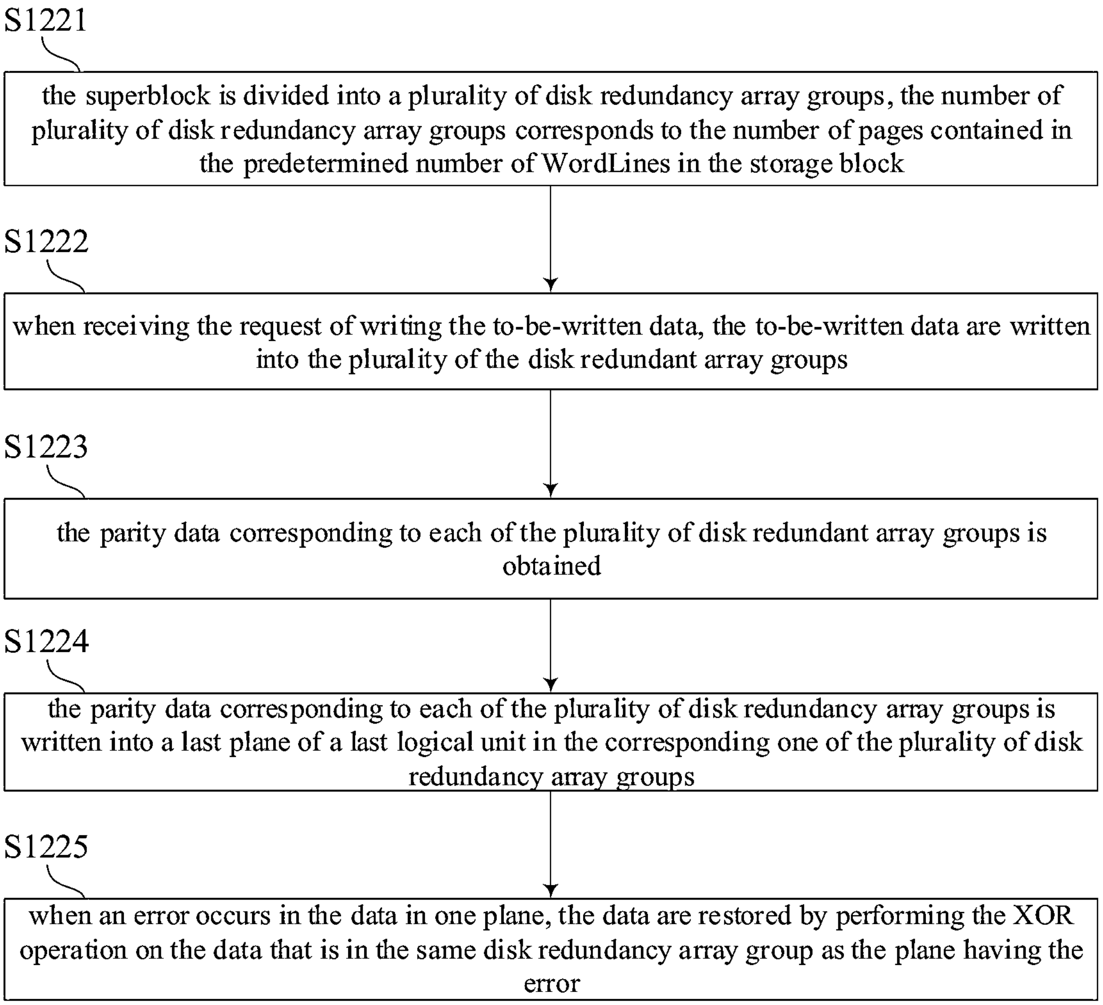
FIG. 7 is a flow chart of the block S12 shown in FIG. 1, according to still another embodiment of the present disclosure.

As shown in FIG. 7, FIG. 7 is a flow chart of the block S12 shown in FIG. 1, according to still another embodiment of the present disclosure. In an embodiment, the superblock is the user data SLC block or the user data XLC block; the above block S12 specifically includes following blocks.

In a block S1221, the superblock is divided into a plurality of disk redundancy array groups, the number of plurality of disk redundancy array groups corresponds to the number of pages contained in the predetermined number of WordLines in the storage block.

The specific number of disk redundancy array groups formed by dividing depends on characteristics of the Nand Flash. For example, the dividing can be performed based on the number of pages contained in one word line, the number of pages contained in two WordLines, the number of pages contained in three WordLines, and so on.

In a block S1222, when receiving the request of writing the to-be-written data, the to-be-written data are written into the plurality of the disk redundant array groups.

In a block S1223, the parity data corresponding to each of the plurality of disk redundant array groups is obtained.

In a block S1224, the parity data corresponding to each of the plurality of disk redundancy array groups is written into a last plane of a last logical unit in the corresponding one of the plurality of disk redundancy array groups.

In a block S1225, when an error occurs in the data in one plane, the data are restored by performing the XOR operation on the data that is in the same disk redundancy array group as the plane having the error.

Figure 8:
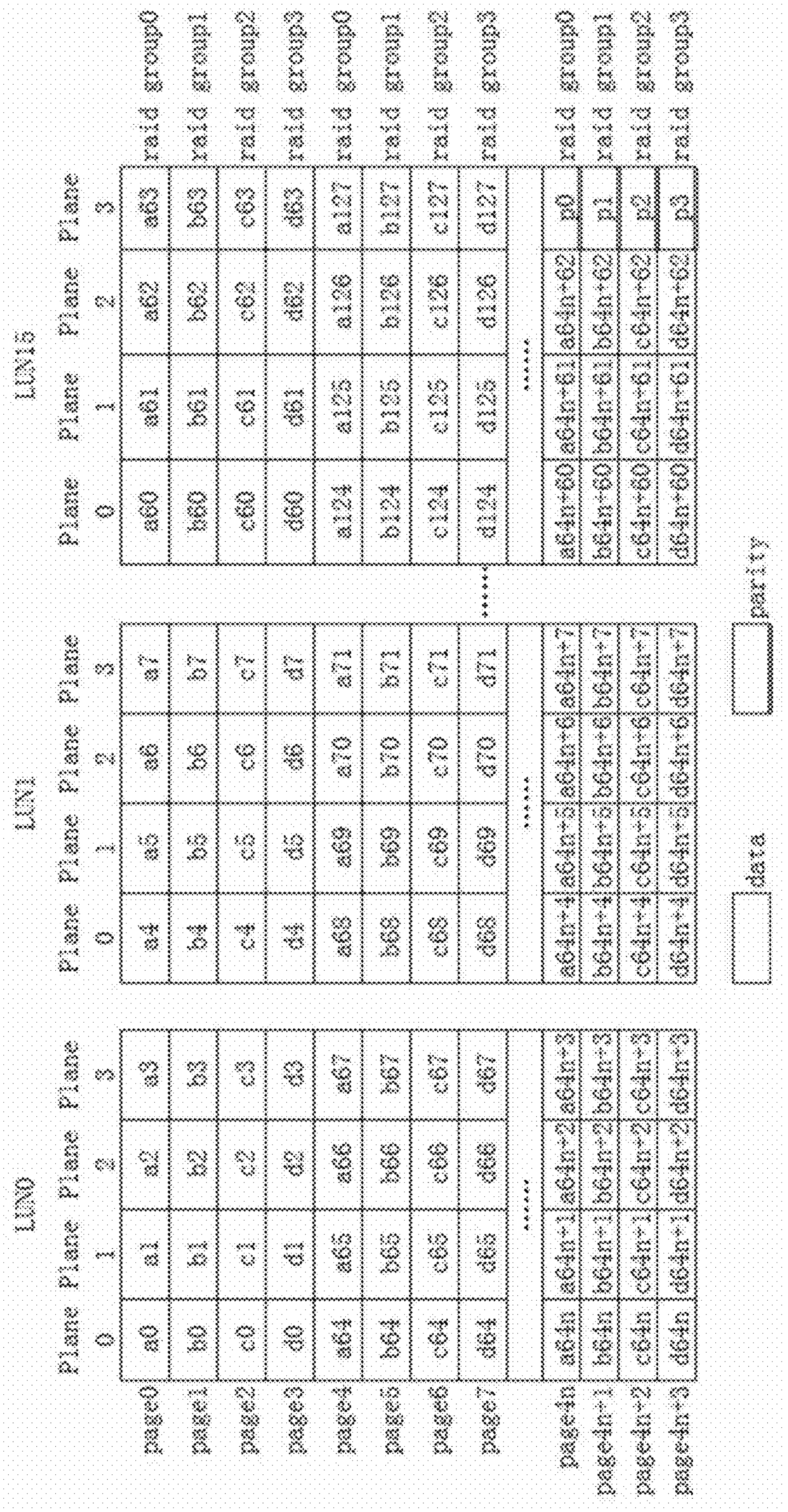
FIG. 8 is a flow chart of the data storage method applied in an application scenario shown in FIG. 7, according to an embodiment of the present disclosure.

As shown in FIG. 8, FIG. 8 is a flow chart of the data storage method applied in an application scenario shown in FIG. 7, according to an embodiment of the present disclosure. For example, one SLC block WordLine has 4 pages. Therefore, the superblock can be divided into 4 RAID groups. When the request of writing the to-be-written data is received, the to-be-written data are written into the plurality of RAID groups of the superblock, and the XOR operation is performed on the to-be-written data. For the plurality of RAID groups, the XOR operations are performed on the to-be-written data at the same time. The XOR operations performed synchronously for the plurality of RAID groups reduces an influence on a writing speed. A specific RAID size n is determined based on requirements of the product for the writing speed and a reading speed. When data (a0-a64n+62) of a first RAID group 0 completes the XOR operation to obtain the parity data (p0), the parity data (p0) is written into the last plane of the last logical unit LUN of the RAID group0, and that is, the parity data p0 is written into the plane 3 of the logical unit LUN15 of the RAID group 0. It is understood that operations for the data (b0-b64n+62, c0-c64n+62, d0-d64n+62, and so on) of other RAID groups are the same as the operation for the data (a0-a64n+62) of the RAID group 0. When an error occurs in the data of one WordLine of the SLC block of one plane, the can be restored by performing XOR operation on the data of other planes in the same RAID group as the plane having the error.

Figure 9:
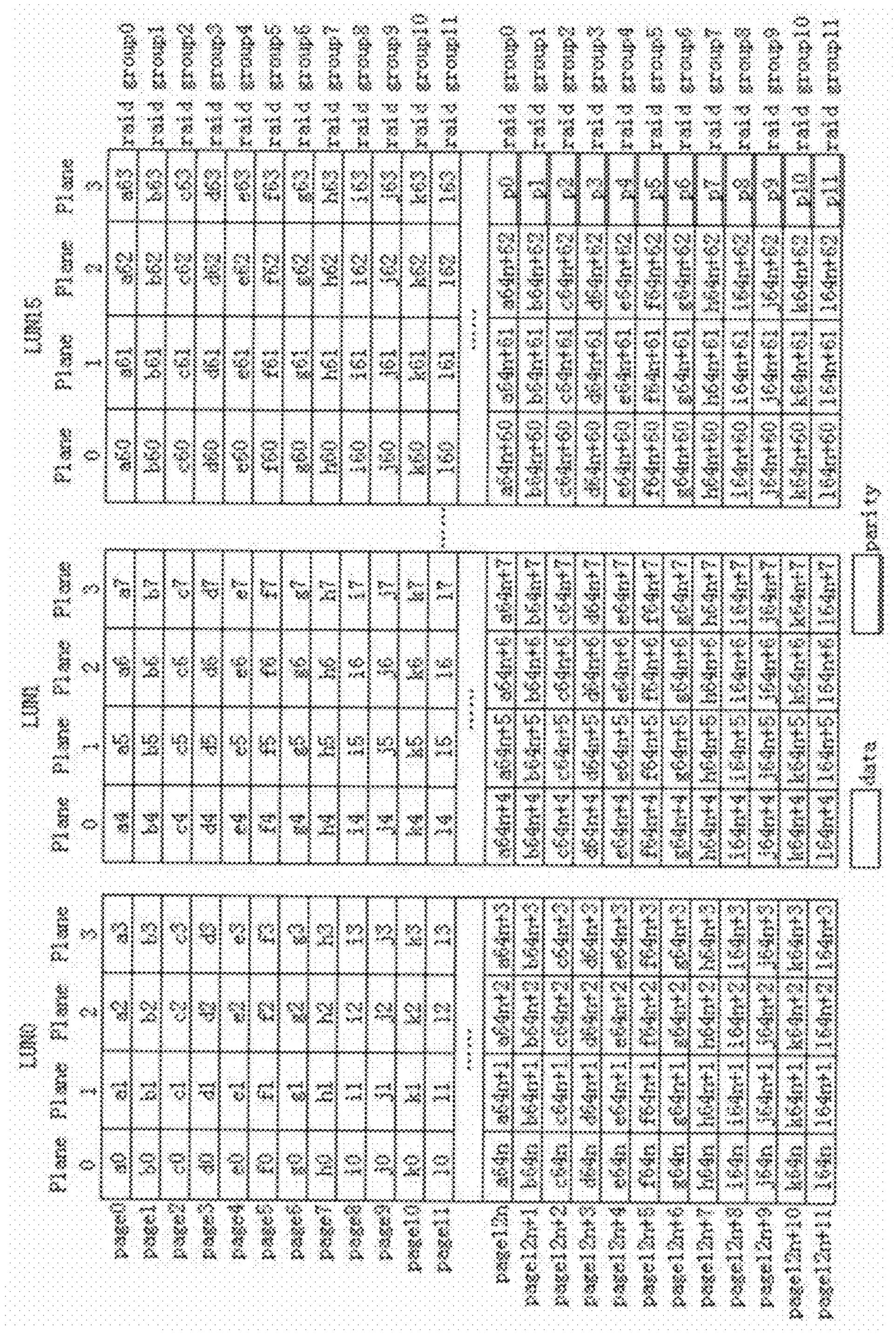
FIG. 9 is a flow chart of the data storage method applied in another application scenario shown in FIG. 7, according to an embodiment of the present disclosure.

As shown in FIG. 9, FIG. 9 is a flow chart of the data storage method applied in another application scenario shown in FIG. 7, according to an embodiment of the present disclosure. The XLC block includes a TLC block or an MLC block or a QLC block. For example, taking the TLC block as an example, where processing of the MLC block and the QLC block is similar to that of the TLC block, the WordLine of one TLC block has 12 pages. Therefore, the superblock can be divided into 12 RAID groups. When the request of writing the to-be-written data is received, the to-be-written data are written into the plurality of RAID groups of the superblock, and the XOR operation is performed on the to-be-written data. The XOR operations can be performed simultaneously on the data of the plurality of RAID groups. The XOR operations performed simultaneously for the plurality of RAID groups reduces the influence on the writing speed. The specific size n of the RAID groups is determined based on the requirements for the writing speed and the reading speed. When the XOR operation is finished performing on the data (a0-a64n+62) of the first RAID group 0 to obtain the parity data (p0), the parity data (p0) is written into the last plane of the last logical unit LUN of RAID group 0. That is, the parity data p0 is written into the plane 3 of the logical unit LUN 15 of the RAID group 0. It is understood that operations on the data (b0-b64n+62, c0-c64n+62, l0-l64n+62, and so on) of other RAID groups are the same as the operation on the data (a0-a64n+62) of the RAID group 0. When an error occurs in the data of one WordLine of one plane of the TLC block, the data can be restored by performing the XOR operation on the data of other planes in the same RAID group as the plane having the error.

In the present embodiment, various RAID protection strengths are designed according to different application scenarios of the superblock, the overall protection capability is improved, and the loss in the user-available OP is reduced. When the plurality of RAID groups operate at the same time, the influence on the writing speed is reduced. In addition, the RAID size can be determined according to the requirements for user-available OP, such that write amplification is reduced. After (127+1), (255+1), or the entire superblock is finished written, the parity data is written. The size of the RAID group and the size of the RAID can be configured flexibly to adapt to different applications.

In an embodiment, the above block S1223 may specifically include: performing the XOR operation on the data of each disk redundancy array group to obtain the parity data corresponding to each disk redundancy array group; or, obtaining, through a buffer swapping mechanism, the parity data corresponding to each disk redundancy array group.

Generally speaking, after writing the to-be-written data, the corresponding parity data can be obtained by performing the XOR operation on the to-be-written data. However, when operations are performed for the plurality of RAID groups at the same time, a RAID buffer may have insufficient resources. In this case, a buffer swap needs to be performed, the corresponding parity data can be obtained through the buffer swapping mechanism.

Figure 10:
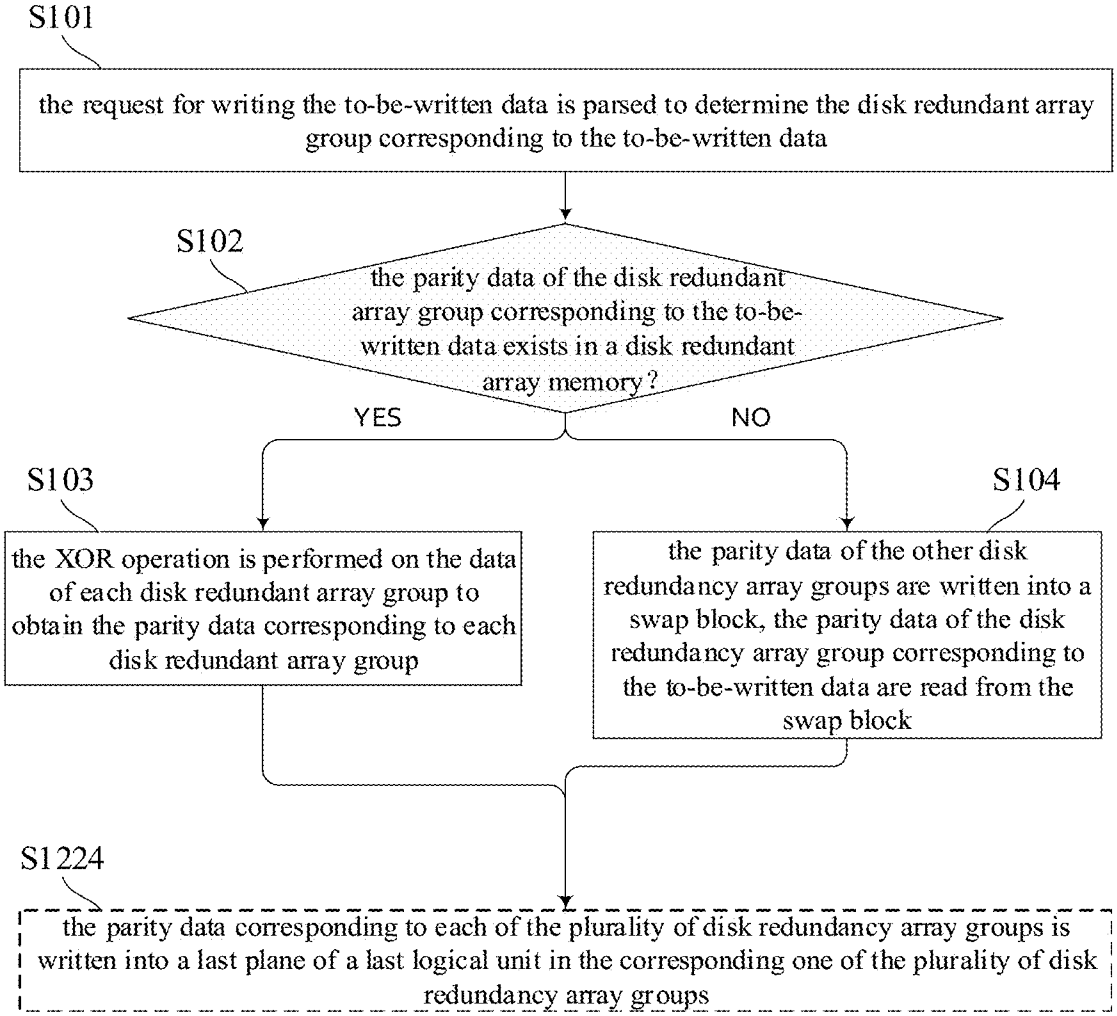
FIG. 10 is a flow chart of obtaining, via a buffer swapping mechanism, parity data corresponding to each disk redundant array set, in the data storage method according to an embodiment of the present disclosure.

Specifically, as shown in FIG. 10, FIG. 10 is a flow chart of obtaining, via the buffer swapping mechanism, parity data corresponding to each disk redundant array set, in the data storage method according to an embodiment of the present disclosure. The step of obtaining the parity data corresponding to each of the plurality of disk redundancy array groups through the buffer swapping mechanism includes following blocks.

In a block S101, the request for writing the to-be-written data is parsed to determine the disk redundant array group corresponding to the to-be-written data.

In a block S102, it is searched whether the parity data of the disk redundant array group corresponding to the to-be-written data exists in a disk redundant array memory. When the parity data exists, a block S103 is performed, and when the parity data does not exist, a block S104 is performed.

In the block S103, the XOR operation is performed on the data of each disk redundant array group to obtain the parity data corresponding to each disk redundant array group.

In the block S104, the parity data of the other disk redundancy array groups are written into a swap block, the parity data of the disk redundancy array group corresponding to the to-be-written data are read from the swap block.

Further, after the block S103 and the block S104, the above block S1224 is performed.

Specifically, after receiving the request writing the to-be-written data, the request is parsed to analyze to which RAID group the instant to-be-written data belongs. Subsequently, it is searched whether the parity data of the RAID group to which the to-be-written data belongs is saved in a RAID buffer. Understandably, when the parity data of the RAID group to which the to-be-written data belongs exists in the RAID buffer, buffer swapping is not required. When the parity data of the RAID group to which the to-be-written data belongs does not exist in the RAID buffer, the parity data of the other RAID groups are written into the swap block, and subsequently, the parity data of the RAID group to which the to-be-written data belongs is read from the swap block. In this way, the corresponding parity data can be written into the page corresponding to the superblock, such that writing of the to-be-written data is completed. By designing a buffer swap process, the RAID protection method in the present disclosure is adapted to any master control platform having more or fewer RAID buffer resources.

Figure 11:
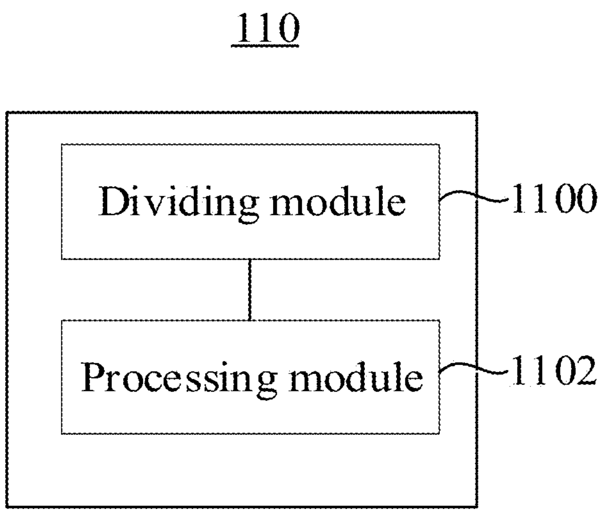
FIG. 11 is a structural schematic diagram of a data storage apparatus according to an embodiment of the present disclosure.

As shown in FIG. 11, FIG. 11 is a structural schematic diagram of a data storage apparatus according to an embodiment of the present disclosure. The data storage apparatus 110 in the present embodiment includes a dividing module 1100 and a processing module 1102 connected to the dividing module 1100. The dividing module 1100 is configured to bind the storage blocks corresponding to each plane of each logical unit in the storage device to each other to form the superblock. The processing module 1102 is configured to use, based on the type of the superblock and the data type of the to-be-written data, the corresponding disk redundancy array protection mechanism to perform data storage operations.

In an embodiment, the superblock is at least one of: the first class private data SLC block, the second class private data SLC block, the user data SLC block, and the user data XLC block.

In an embodiment, the superblock is the first class private data SLC block; the processing module 1102 using, based on the type of the superblock and the data type of the to-be-written data, the corresponding disk redundancy array protection mechanism to perform data storage operations, includes the following. When receiving the request of writing the to-be-written data, the to-be-written data is written into both the first logical unit of the superblock and the second logical unit of the superblock, and the second logical unit is mirrored with the first logical unit. When an error occurs in the data in the first logical unit, the data is restored by mirroring the data in the second logical unit.

In an embodiment, the superblock is the user data SLC block or the user data XLC block, and the processing module 1102 using the corresponding disk redundant array protection mechanism to perform the data storage operation, based on the type of the superblock and the data type of to-be-written data, includes the following. The superblock is divided into a plurality of disk redundancy array groups, the number of the plurality of disk redundancy array groups corresponds to the number of pages contained in the predetermined number of WordLines in the storage block. When receiving the request of writing the to-be-written data, the to-be-written data are written into the plurality of the disk redundant array groups. The parity data corresponding to each of the plurality of disk redundant array groups is obtained. The parity data corresponding to each of the plurality of disk redundancy array groups is written into the last plane of the last logical unit in the corresponding one of the plurality of disk redundancy array groups. When the error occurs in the data in one plane, the data are restored by performing the XOR operation on the data that is in the same disk redundancy array group as the plane having the error.

In an embodiment, the processing module 1102 obtaining the parity data corresponding to each of the plurality of disk redundant array groups includes the following. The XOR operation is performed on the data of each disk redundancy array group to obtain the parity data corresponding to each disk redundancy array group; or, obtaining, through the buffer swapping mechanism, the parity data corresponding to each disk redundancy array group.

In an embodiment, the processing module 1102 obtaining, through the buffer swapping mechanism, the parity data corresponding to each disk redundancy array group includes the following. The request for writing the to-be-written data is parsed to determine the disk redundant array group corresponding to the to-be-written data. It is searched whether the parity data of the disk redundant array group corresponding to the to-be-written data exists in the disk redundant array memory. When the parity data exists, the XOR operation is performed on the data of each disk redundant array group to obtain the parity data corresponding to each disk redundant array group. When the parity data does not exist, the parity data of the other disk redundancy array groups are written into the swap block, the parity data of the disk redundancy array group corresponding to the to-be-written data are read from the swap block.

Details of the data storage apparatus 110 of the present disclosure implementing the data storage method may be referred to the data storage method in the above embodiments, which will not be repeated herein.

Figure 12:
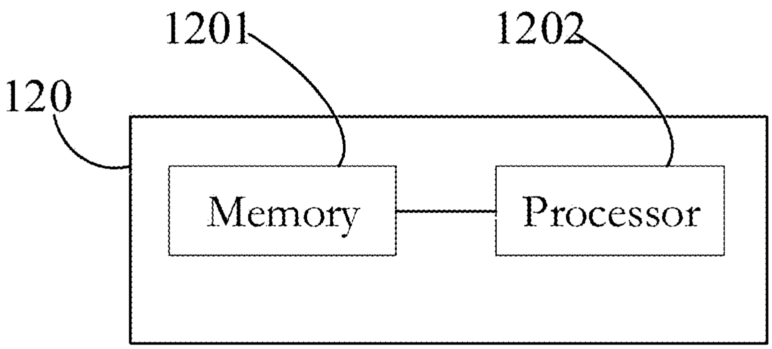
FIG. 12 is a structural schematic diagram of a storge device according to an embodiment of the present disclosure.

As shown in FIG. 12, FIG. 12 is a structural schematic diagram of a storge device according to an embodiment of the present disclosure. The storage device 120 in the present embodiment includes a processor 1202 and a memory 1201 connected to the processor 1202. The memory 1201 is configured to store program instructions. The processor 1202 is configured to execute the program instructions stored in the memory 1201 to implement blocks of the data storage method in the above embodiments. In an application scenario, the storage device 120 may include, but is not limited to: a microcomputer and a server.

Specifically, the processor 1202 is configured to control the processor 1202 itself and the memory 1201 to implement the steps of the data storage method in the above embodiments.

The processor 1202 may also be referred to as a central processing unit (CPU). The processor 1202 may be an integrated circuit chip having signal processing capabilities. The processor 1202 may alternatively be a general purpose processor, a digital signal processor (DSP), an application specific integrated circuit (ASIC), a field-programmable gate array (FPGA) or other programmable logic devices, a discrete gate or transistor logic device, or a discrete hardware component. The general purpose processor may be a microprocessor or any conventional processor. In addition, the processor 1202 may be configured as an integrated circuit chip.

Figure 13:
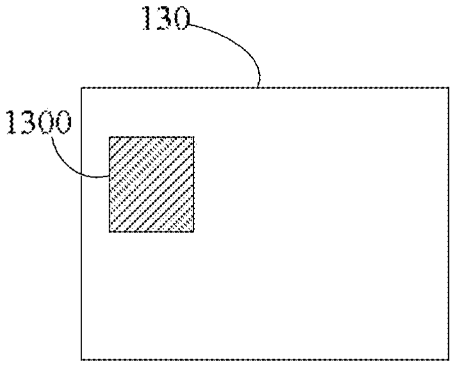
FIG. 13 is a structural schematic diagram of a computer-readable storage medium according to an embodiment of the present disclosure.

As shown in FIG. 13, FIG. 13 is a structural schematic diagram of a computer-readable storage medium according to an embodiment of the present disclosure. The computer-readable storage medium 130 of the present disclosure stores program instructions 1300. The program instructions 1300 are executed by a processor to implement the steps of the data storage method in the above embodiments.

The computer-readable storage medium 130 may specifically be a medium that can store the program instructions 1300, such as a USB flash drive, a removable hard drive, a read-only memory (ROM), a random-access memory (RAM), a magnetic disc, or an optical disc. Alternatively, the computer-readable storage medium 130 may be a server that stores the program instructions 1300. The server may send the stored program instructions 1300 to other devices to run or may run the stored program instructions 1300 itself.

In various embodiments provided in the present disclosure, it is understood that the methods, the apparatus and the device may be implemented in other ways. For example, the apparatus and the device described in the above are merely schematic, for example, modules or units are divided merely based on logical functions, and in practice, modules or units may be divided in other ways. For example, a plurality of units or components may be combined with each other or integrated into another system; or some features may be omitted or not implemented. Furthermore, mutual coupling or direct coupling or communicative connection shown or discussed may be indirect coupling or communicative connection through some interfaces, devices or units, and the connection may be electrical or mechanical.

Units illustrated as separated units may or may not be physically separated from each other. Components shown as units may or may not be physical units, i.e., the components may be located at one place or may also be distributed over a plurality of network units. Some or all of the units may be selected to fulfil the purpose of the present embodiment according to the actual need. In addition, functional units in various embodiments of the present disclosure may be integrated in a single processing unit or may be physically present separate from each other; or two or more units may be integrated in one single unit. The above integrated units may be implemented either in the form of hardware or in the form of software functional units.

The integrated unit may be stored in a computer-readable storage medium when implemented the software functional unit and sold or used as a stand-alone product. Based on the above understanding, the technical solution of the present disclosure in essence, or a part of the technical solution contributed to the prior art, or a part or an entirety of the technical solution may be configured in the form of the software product. The software product is stored in a storage medium including instructions to cause a computer device (which may be a personal computer, a server, or a network device, and so on) or a processor to perform all or part of the methods of the various embodiments of the present disclosure. The aforementioned storage media include: the USB flash drive, the portable hard drive, the read-only memory (ROM), the random access memory (RAM), the magnetic disk, or the optical disk, and other media that can store program codes.

What is claimed is:

1. A data storage method, comprising:

binding a plurality of storage blocks to each other to form one superblock, wherein, each plane of each of a plurality of logical units in a storage device provides one storage block to form the plurality of storage blocks;

performing, using a corresponding disk redundancy array protection mechanism, data storage operations based on a type of the superblock and a data type of to-be-written data;

wherein, the type of the superblock is a user data SLC block or a user data XLC block; the performing, using the corresponding disk redundancy array protection mechanism, data storage operations based on the type of the superblock and the data type of to-be-written data, comprises:

dividing the superblock into a plurality of disk redundancy array groups, wherein the number of the plurality of disk redundancy array groups is determined based on the number of pages contained in the predetermined number of WordLines in the storage block;

writing the to-be-written data are written into the plurality of the disk redundant array groups when receiving a request of writing the to-be-written data;

obtaining parity data corresponding to each of the plurality of disk redundant array groups;

writing the parity data corresponding to each of the plurality of disk redundancy array groups into a last plane of a last logical unit in the corresponding one of the plurality of disk redundancy array groups; and restoring, when an error occurring in the data in one plane, the data by performing an XOR operation on the data that is in a same disk redundancy array group as the plane having the error.

2. The data storage method according to claim 1, wherein the type of the superblock further comprises: a first class private data SLC block and a second class private data SLC block.

3. The data storage method according to claim 2, wherein, when the type of the superblock is the first class private data SLC block, the performing, using the corresponding disk redundancy array protection mechanism, data storage operations based on the type of the superblock and the data type of to-be-written data, comprises:

writing the to-be-written data into both a first logical unit of the superblock and a second logical unit of the superblock when receiving a request of writing the to-be-written data, wherein the second logical unit is mirrored with the first logical unit;

restoring, when an error occurring in the data in the first logical unit, the data by mirroring the data in the second logical unit.

4. The data storage method according to claim 2, wherein, when the type of the superblock is the second class private data SLC block, the performing, using the corresponding disk redundancy array protection mechanism, data storage operations based on the type of the superblock and the data type of to-be-written data, comprises:

writing the to-be-written data sequentially into the plurality of logical units of the superblock when receiving a request of writing the to-be-written data; performing an exclusive-OR (XOR) operation on the to-be-written data to obtain parity data;

writing the parity data into a last plane of a last logical unit of the plurality of logical units;

restoring, when an error occurring in the data in any plane of any one of the plurality of logical units, the data by performing the XOR operation on the data in the plurality of logical units.

5. The data storage method according to claim 1, wherein the obtaining parity data corresponding to each of the plurality of disk redundant array groups, comprises:

performing the XOR operation on the data of each of the plurality of disk redundancy array groups to obtain the parity data corresponding to each of the plurality of disk redundancy array groups; or obtaining, through a buffer swapping mechanism, the parity data corresponding to each of the plurality of disk redundancy array groups.

6. The data storage method according to claim 5, wherein the obtaining, through the buffer swapping mechanism, the parity data corresponding to each of the plurality of disk redundancy array groups, comprises:

parsing the request of writing the to-be-written data to determine one disk redundant array group of the plurality of disk redundant array groups corresponding to the to-be-written data;

searching whether parity data of the disk redundant array group corresponding to the to-be-written data exists in a disk redundant array memory;

performing, when the parity data existing, the XOR operation on the data of each of the plurality of disk redundant array groups to obtain the parity data corresponding to each of the plurality of disk redundant array groups; and writing, when the parity data not existing, parity data of the other disk redundancy array groups into a swap block; and reading the parity data of the disk redundancy array group corresponding to the to-be-written data from the swap block.

7. A storage device, comprising a processor and a memory connected to the processor, wherein the memory is configured to store program instructions, the processor is configured to execute the program instructions to implement operations of:

binding a plurality of storage blocks, to each other to form one superblock, wherein, each plane of each of a plurality of logical units in a storage device provides one storage block to form the plurality of storage blocks;

performing, using a corresponding disk redundancy array protection mechanism, data storage operations based on a type of the superblock and a data type of to-be-written data;

wherein, the type of the superblock is a first class private data SLC block; the performing, using the corresponding disk redundancy array protection mechanism, data storage operations based on the type of the superblock and the data type of to-be-written data, comprises:

writing the to-be-written data into both a first logical unit of the superblock and a second logical unit of the superblock when receiving a request of writing the to-be-written data, wherein, the first logical unit and the second logical unit are two of the plurality of logical units providing two of the plurality of storage blocks for forming the superblock; and the second logical unit is mirrored with the first logical unit;

restoring, when an error occurring in the data in the first logical unit, the data by mirroring the data in the second logical unit.

8. The storage device according to claim 7, wherein the type of the superblock further comprises: a second class private data SLC block, a user data SLC block, and a user data XLC block.

9. The storage device according to claim 8, wherein, when the type of the superblock is the second class private data SLC block, the performing, using the corresponding disk redundancy array protection mechanism, data storage operations based on the type of the superblock and the data type of to-be-written data, comprises:

writing the to-be-written data sequentially into the plurality of logical units of the superblock when receiving a request of writing the to-be-written data; performing an exclusive-OR (XOR) operation on the to-be-written data to obtain parity data;

writing the parity data into a last plane of a last logical unit of the plurality of logical units;

restoring, when an error occurring in the data in any plane of any one of the plurality of logical units, the data by performing the XOR operation on the data in the plurality of logical units.

10. The storage device according to claim 8, wherein, when the type of the superblock is the user data SLC block or the user data XLC block, the performing, using the corresponding disk redundancy array protection mechanism, data storage operations based on the type of the superblock and the data type of to-be-written data, comprises:

dividing the superblock into a plurality of disk redundancy array groups, wherein the number of the plurality of disk redundancy array groups is determined based on the number of pages contained in the predetermined number of WordLines in the storage block;

writing the to-be-written data are written into the plurality of the disk redundant array groups when receiving a request of writing the to-be-written data;

obtaining parity data corresponding to each of the plurality of disk redundant array groups;

writing the parity data corresponding to each of the plurality of disk redundancy array groups into a last plane of a last logical unit in the corresponding one of the plurality of disk redundancy array groups; and restoring, when an error occurring in the data in one plane, the data by performing an XOR operation on the data that is in a same disk redundancy array group as the plane having the error.

11. The storage device according to claim 10, wherein the obtaining parity data corresponding to each of the plurality of disk redundant array groups, comprises:

performing the XOR operation on the data of each of the plurality of disk redundancy array groups to obtain the parity data corresponding to each of the plurality of disk redundancy array groups; or obtaining, through a buffer swapping mechanism, the parity data corresponding to each of the plurality of disk redundancy array groups.

12. The storage device according to claim 11, wherein the obtaining, through the buffer swapping mechanism, the parity data corresponding to each of the plurality of disk redundancy array groups, comprises:

parsing the request of writing the to-be-written data to determine one disk redundant array group of the plurality of disk redundant array groups corresponding to the to-be-written data;

searching whether parity data of the disk redundant array group corresponding to the to-be-written data exists in a disk redundant array memory;

performing, when the parity data existing, the XOR operation on the data of each of the plurality of disk redundant array groups to obtain the parity data corresponding to each of the plurality of disk redundant array groups; and writing, when the parity data not existing, parity data of the other disk redundancy array groups into a swap block; and reading the parity data of the disk redundancy array group corresponding to the to-be-written data from the swap block.

13. A non-transitory computer-readable storage medium, storing program instructions, wherein the program instructions, when being executed by a processor, are configured to implement operations of:

binding a plurality of storage blocks, to each other to form one superblock; wherein, each plane of each of a plurality of logical units in a storage device provides one storage block to form the plurality of storage blocks;

performing, using a corresponding disk redundancy array protection mechanism, data storage operations based on a type of the superblock and a data type of to-be-written data;

wherein, the type of the superblock is a second class private data SLC block, the performing, using the corresponding disk redundancy array protection mechanism, data storage operations based on the type of the superblock and the data type of to-be-written data, comprises:

when receiving a request of writing the to-be-written data, writing the to-be-written data sequentially into more than one logical units of the plurality of logical units, which provide storage blocks for forming the superblock; and performing an exclusive-OR (XOR) operation on the to-be-written data to obtain parity data;

writing the parity data into a last plane of a last logical unit of the plurality of logical units;

restoring, when an error occurring in the data in any plane of any one of the plurality of logical units, the data by performing the XOR operation on the data in the plurality of logical units.

14. The non-transitory computer-readable storage medium according to claim 13, wherein the type of the superblock further comprises: a first class private data SLC block, a user data SLC block, and a user data XLC block.

15. The non-transitory computer-readable storage medium according to claim 14, wherein, when the type of the superblock is the first class private data SLC block, the performing, using the corresponding disk redundancy array protection mechanism, data storage operations based on the type of the superblock and the data type of to-be-written data, comprises:

writing the to-be-written data into both a first logical unit of the superblock and a second logical unit of the superblock when receiving a request of writing the to-be-written data, wherein the second logical unit is mirrored with the first logical unit;

restoring, when an error occurring in the data in the first logical unit, the data by mirroring the data in the second logical unit.

16. The non-transitory computer-readable storage medium according to claim 14, wherein, when the type of the superblock is the user data SLC block or the user data XLC block, the performing, using the corresponding disk redundancy array protection mechanism, data storage operations based on the type of the superblock and the data type of to-be-written data, comprises:

dividing the superblock into a plurality of disk redundancy array groups, wherein the number of the plurality of disk redundancy array groups is determined based on the number of pages contained in the predetermined number of WordLines in the storage block;

writing the to-be-written data are written into the plurality of the disk redundant array groups when receiving a request of writing the to-be-written data;

obtaining parity data corresponding to each of the plurality of disk redundant array groups;

writing the parity data corresponding to each of the plurality of disk redundancy array groups into a last plane of a last logical unit in the corresponding one of the plurality of disk redundancy array groups; and restoring, when an error occurring in the data in one plane, the data by performing an XOR operation on the data that is in a same disk redundancy array group as the plane having the error.

17. The non-transitory computer-readable storage medium according to claim 16, wherein the obtaining parity data corresponding to each of the plurality of disk redundant array groups, comprises:

performing the XOR operation on the data of each of the plurality of disk redundancy array groups to obtain the parity data corresponding to each of the plurality of disk redundancy array groups; or obtaining, through a buffer swapping mechanism, the parity data corresponding to each of the plurality of disk redundancy array groups.

* * * * *